US012196044B2

(12) United States Patent
Fox

(10) Patent No.: US 12,196,044 B2
(45) Date of Patent: Jan. 14, 2025

(54) MCEI TROUGH FOR INDUCTIVE COUPLER

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 485 days.

(21) Appl. No.: 17/698,621

(22) Filed: Mar. 18, 2022

(65) Prior Publication Data

US 2022/0213737 A1 Jul. 7, 2022

(51) Int. Cl.

| | |
|---|---|
| ***E21B 7/02*** | (2006.01) |
| ***E21B 17/02*** | (2006.01) |
| ***E21B 47/13*** | (2012.01) |
| ***H01F 38/14*** | (2006.01) |

(52) U.S. Cl.

CPC ...... *E21B 17/0285* (2020.05); *E21B 17/0283* (2020.05); *E21B 47/13* (2020.05); *H01F 38/14* (2013.01); *H01F 2038/143* (2013.01)

(58) Field of Classification Search

CPC .. E21B 17/0285; E21B 17/0283; E21B 47/13; H01F 38/14; H01F 2038/143; H01F 27/24

See application file for complete search history.

(56) References Cited

U.S. PATENT DOCUMENTS 2,303,108 A * 11/1942 Blackburn ............... H02G 7/06 403/396
4,636,667 A * 1/1987 Holzinger ............ H02K 41/033 104/294
4,735,762 A * 4/1988 Lasche ................... H02K 44/08 976/DIG. 3
9,044,798 B2 * 6/2015 Peter ..................... B21C 23/085
10,898,005 B2 * 1/2021 Grey .................... A47C 19/025
2004/0104797 A1 * 6/2004 Hall ...................... E21B 17/028 336/132
2005/0001738 A1 * 1/2005 Hall ........................ E21B 47/13 340/854.8
2005/0173128 A1 * 8/2005 Hall ...................... E21B 17/003 166/380
2008/0083529 A1 * 4/2008 Hall ........................ F16L 15/08 166/66
2014/0284065 A1 * 9/2014 Fraignac ............... E21B 17/042 166/242.6
2016/0049718 A1 * 2/2016 Mueller ................. B22D 19/04 343/720
2022/0235615 A1 * 7/2022 Fox ...................... E21B 17/0283
2022/0251907 A1 * 8/2022 Fox ........................ E21B 17/003

* cited by examiner

*Primary Examiner* — Amine Benlagsir

(57) ABSTRACT

A magnetically conductive electrically insulating (MCEI) trough for an inductive coupler in a drill pipe, drill string, and other downhole tools. The MCEI trough may be a ring or two or more ring segments. The trough may comprise interior side and bottom walls forming an open channel. The interior walls may comprise one or more axial flutes. An exterior wall may be spaced apart from the interior walls. The spaced apart interior and exterior walls may form a top surface. The exterior wall may comprise one or more flutes. The flutes may protrude from the respective wall surfaces, or the flutes may protrude into the wall surfaces. A wire coil may be laid within the open channel. The wire coil may comprise axial corrugations. The axial corrugations may couple with the axial flutes of the interior side walls. The wire coil may comprise wire strands laid within the trough.

20 Claims, 17 Drawing Sheets

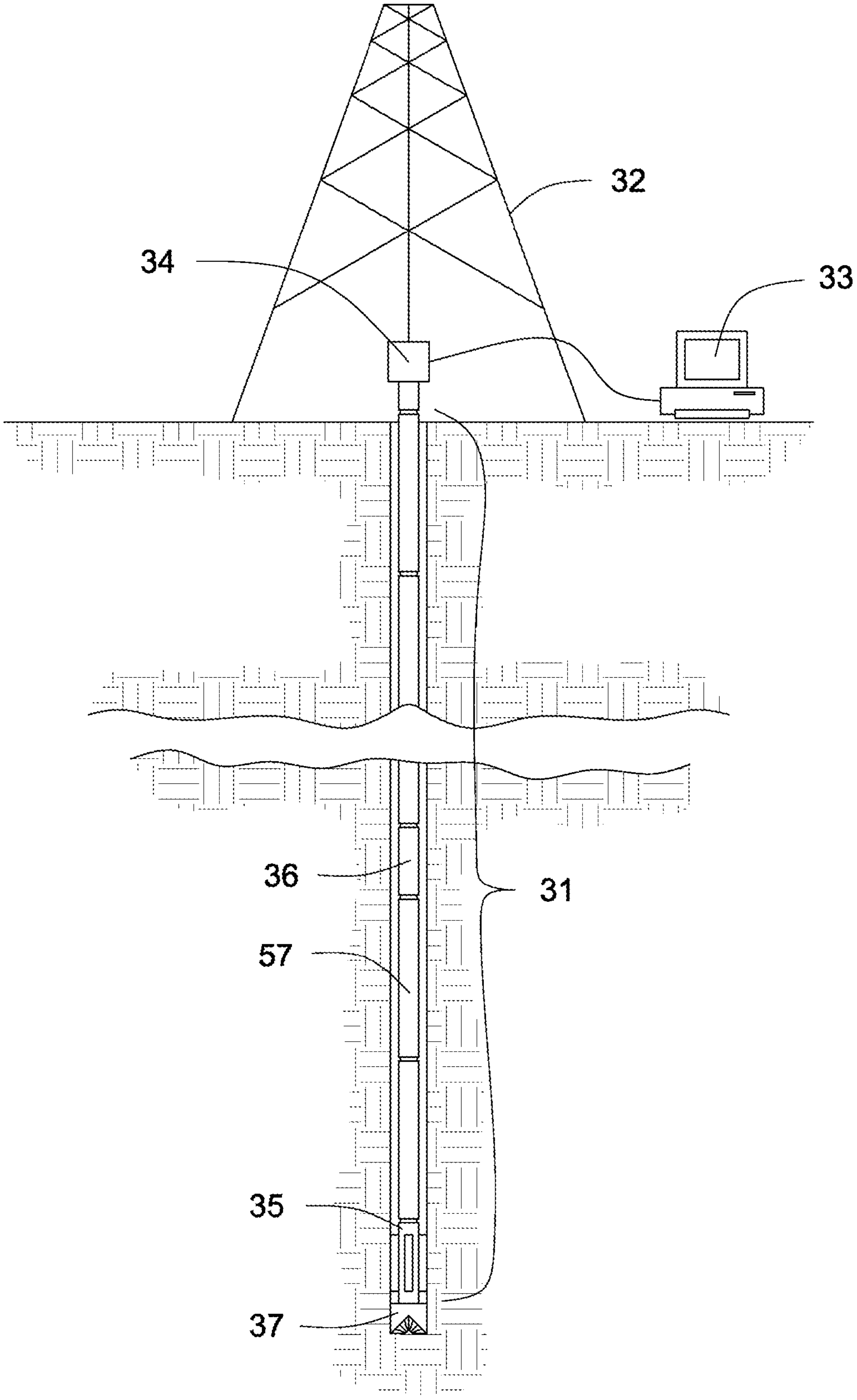
(Prior Art) FIG. 6

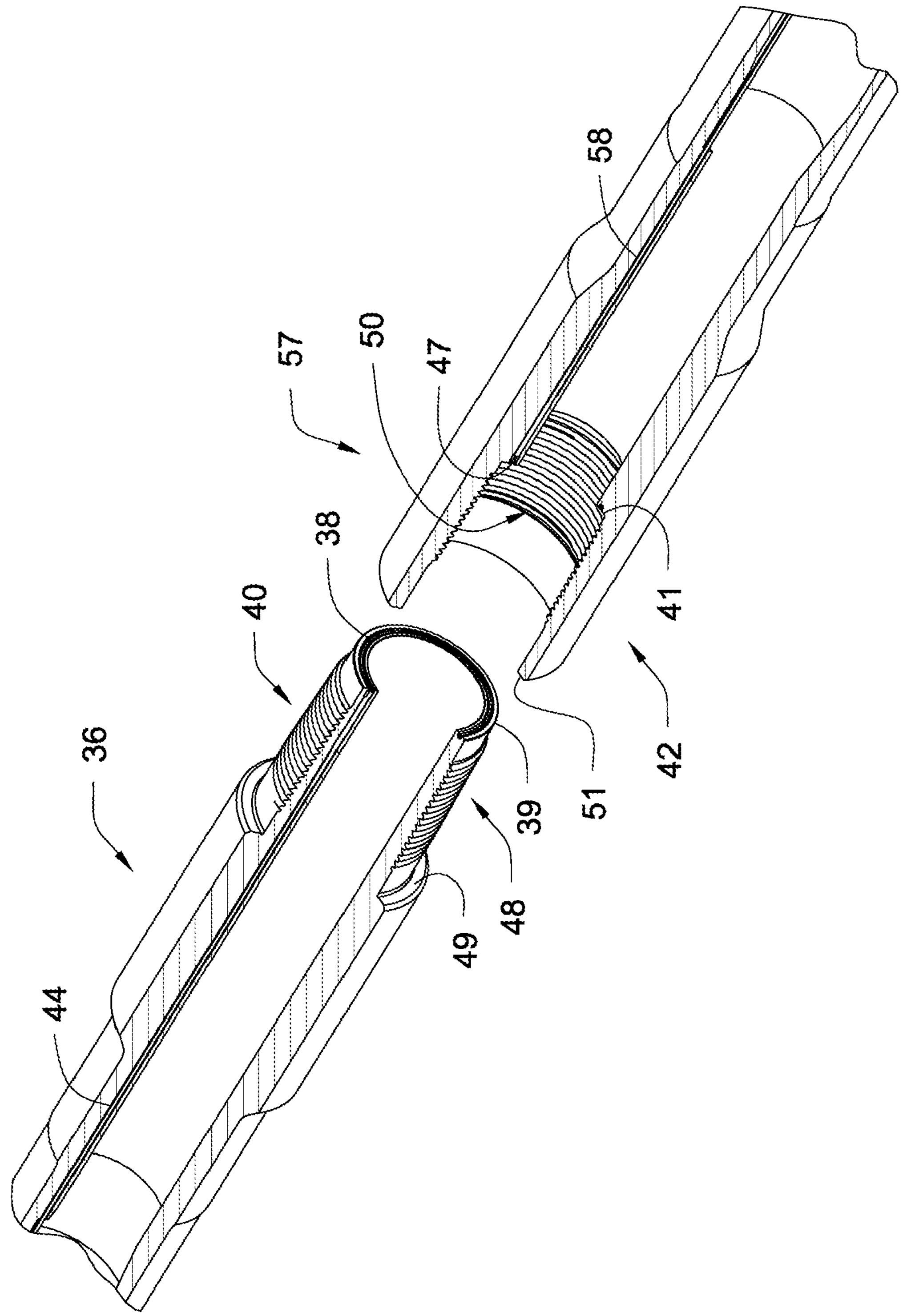
(Prior Art) FIG. 7

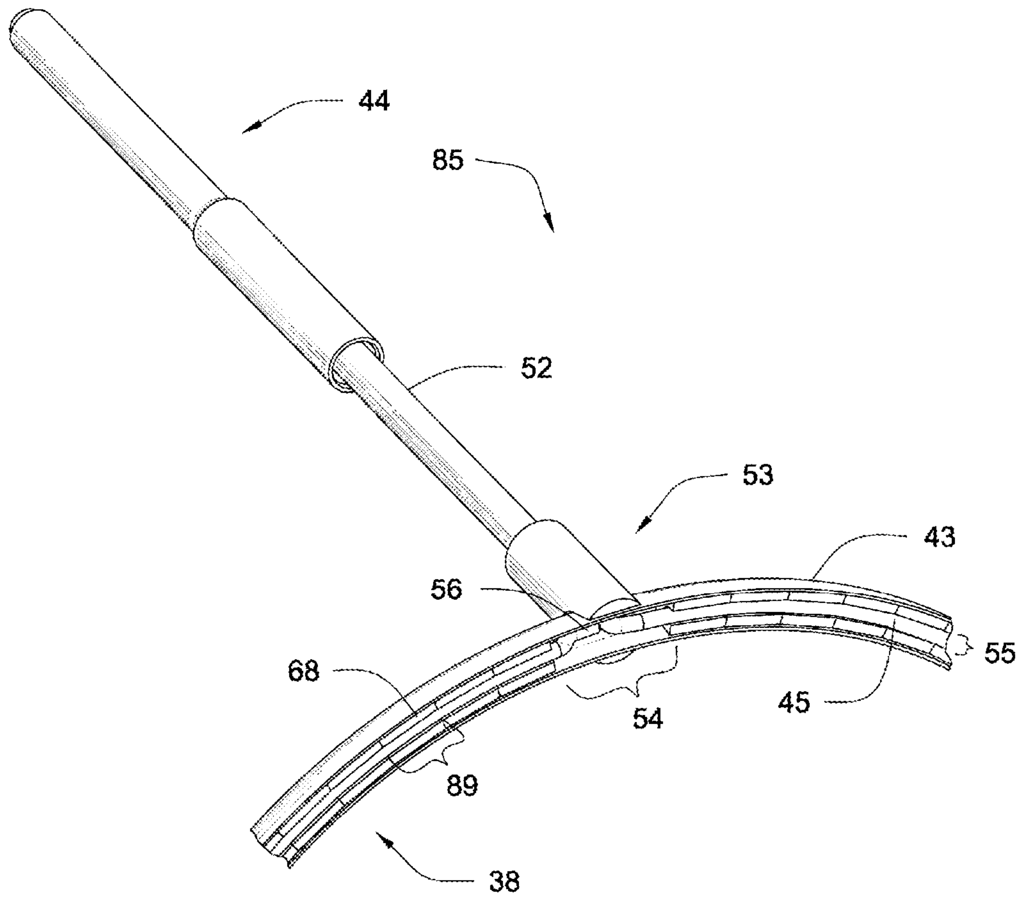
(Prior Art) FIG. 8

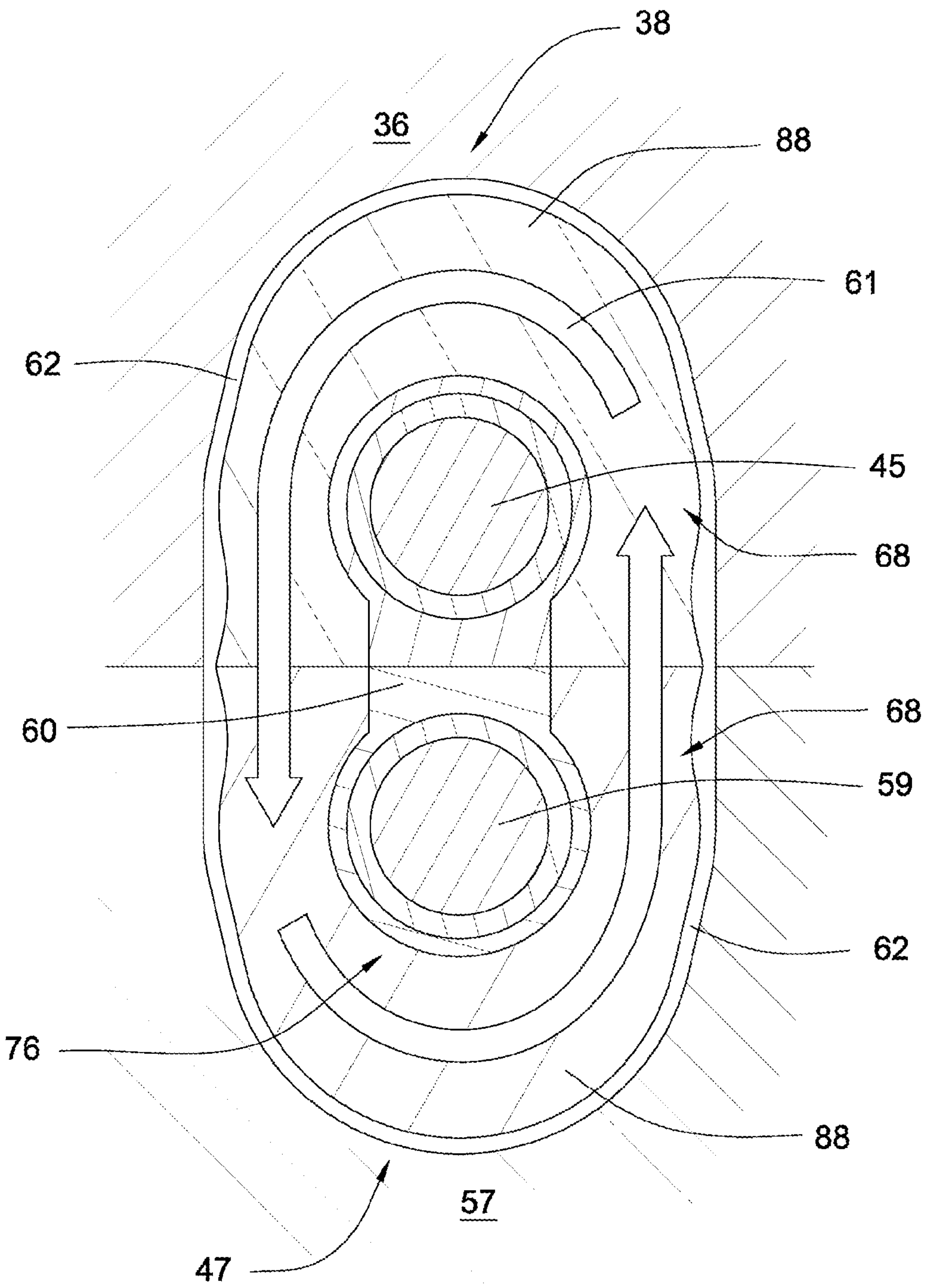
(Prior Art) FIG. 9

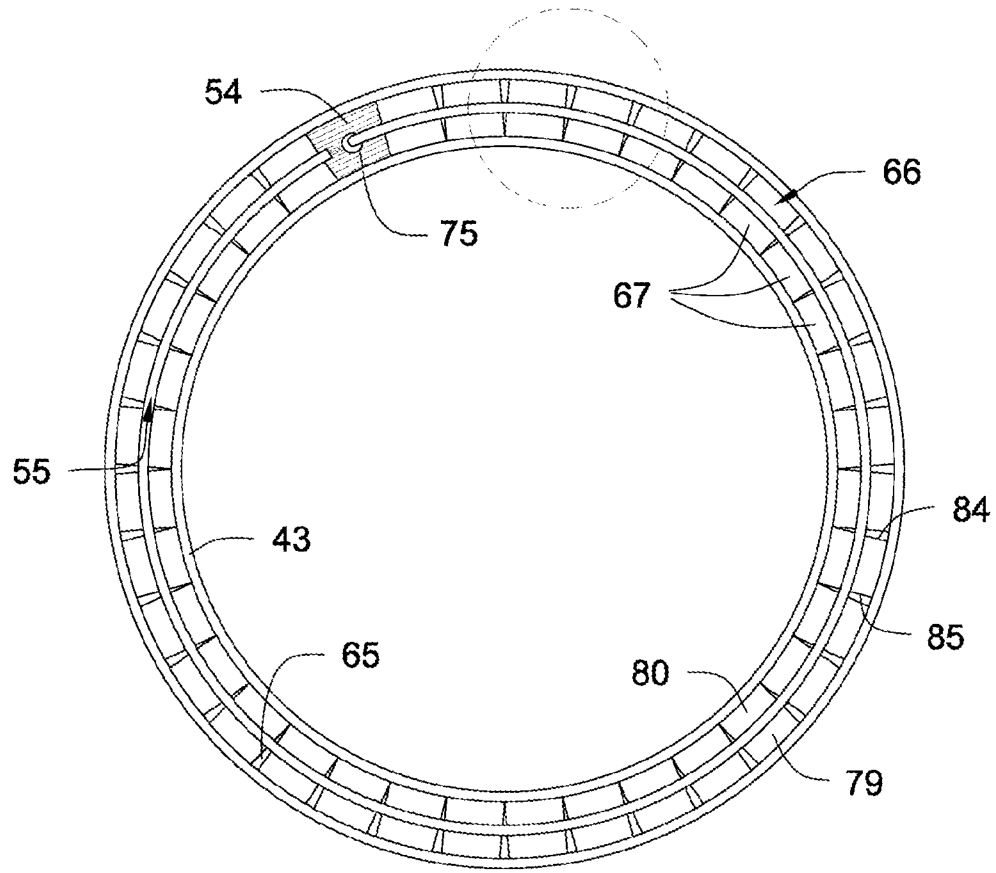
(Prior Art) FIG. 10
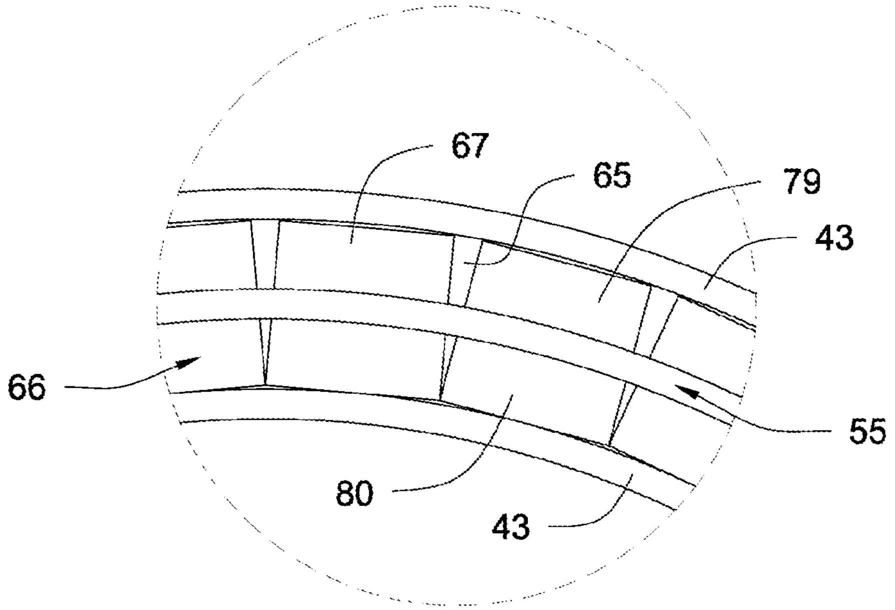
(Prior Art) FIG. 11

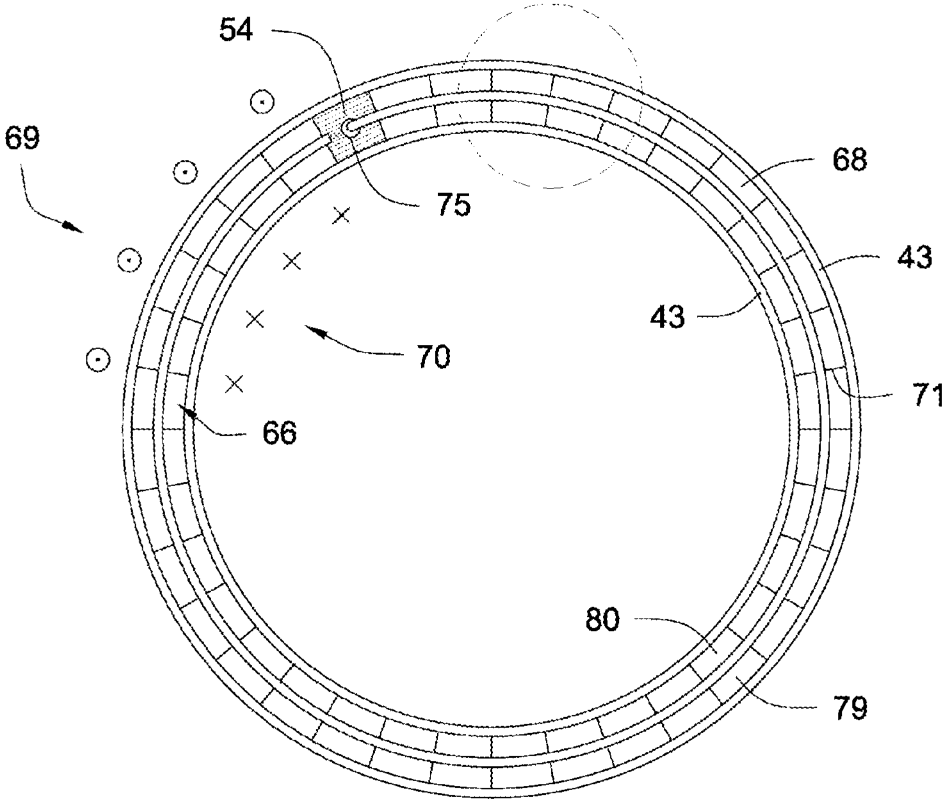
(Prior Art) FIG. 12
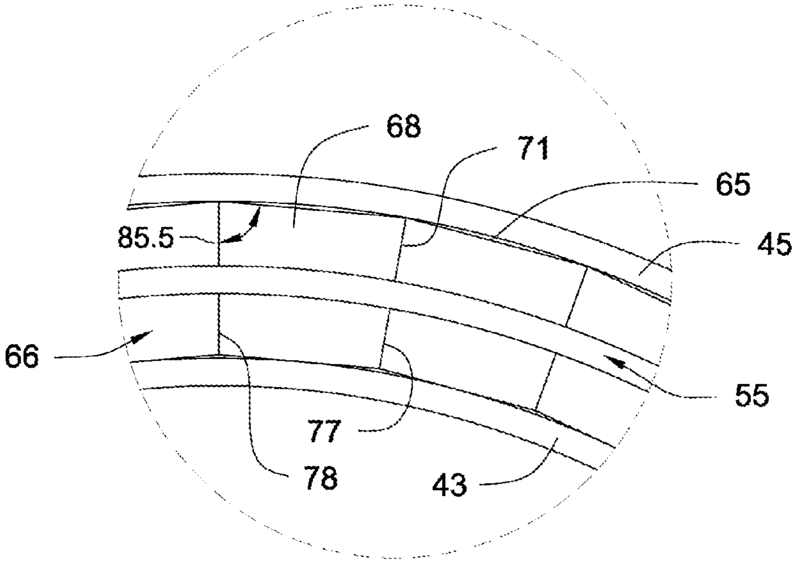
(Prior Art) FIG. 13

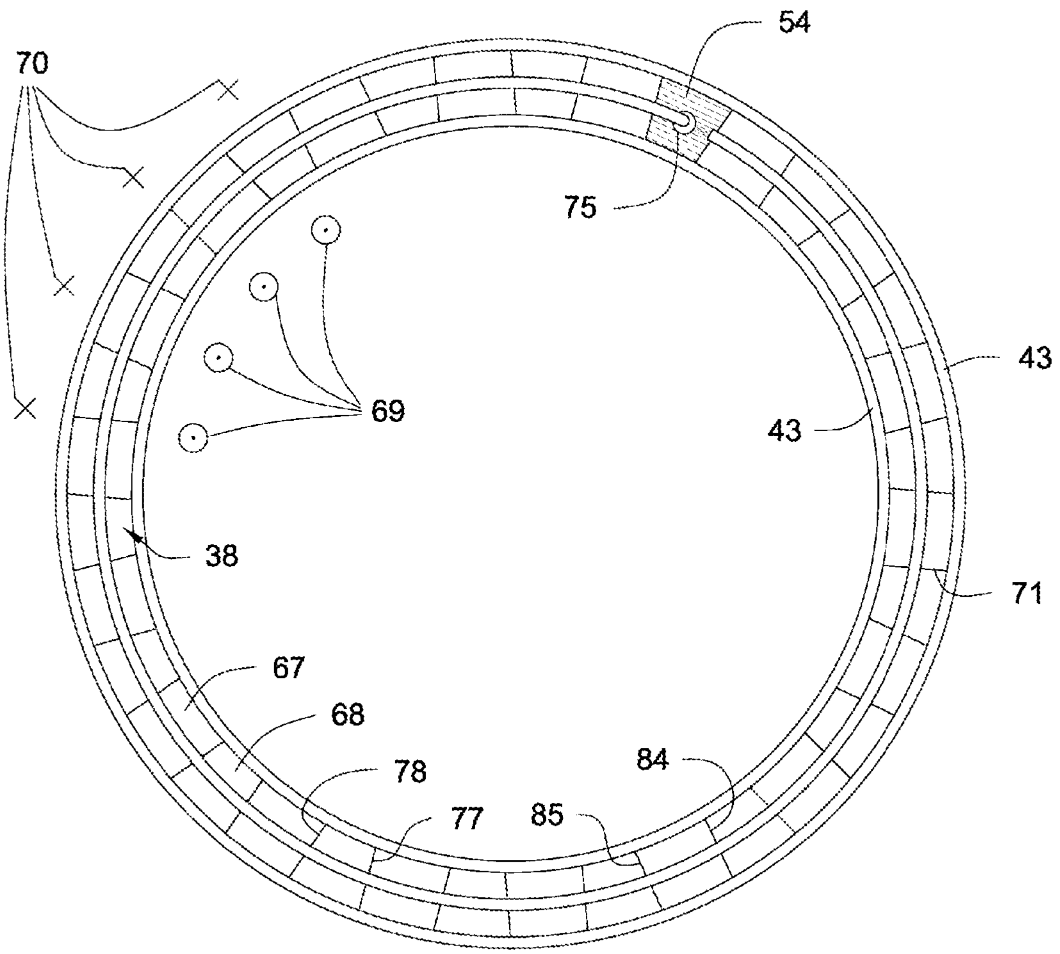
(Prior Art) FIG. 14

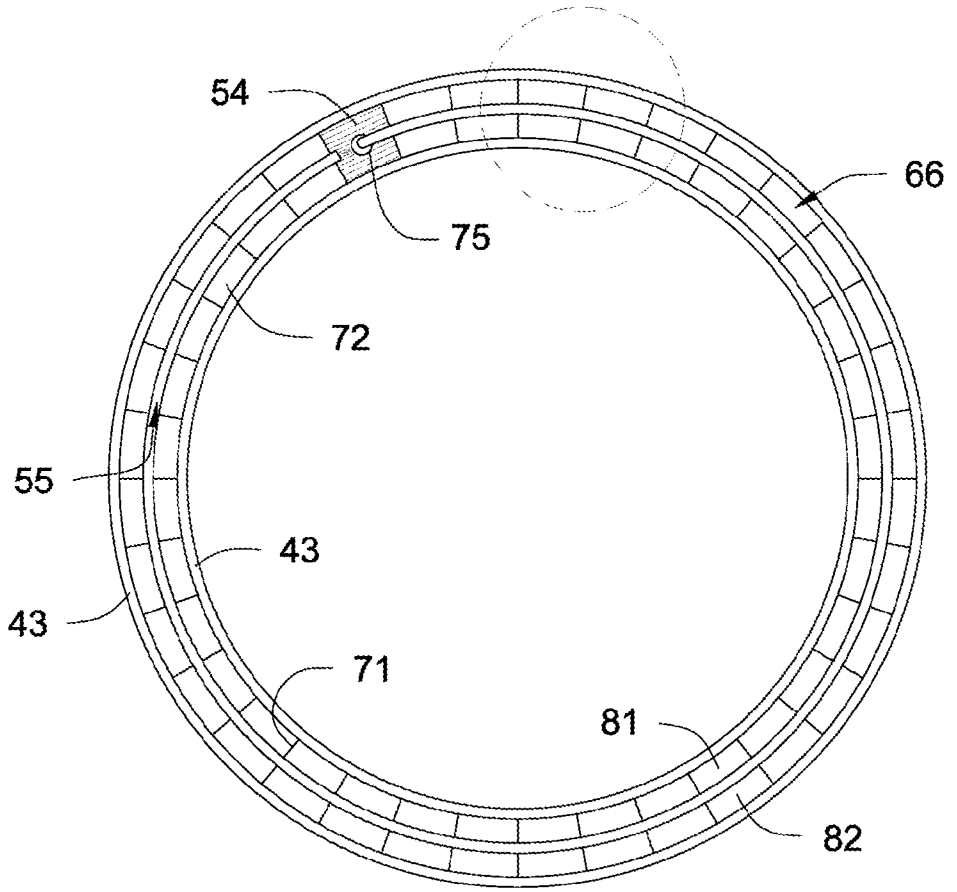
(Prior Art) FIG. 15
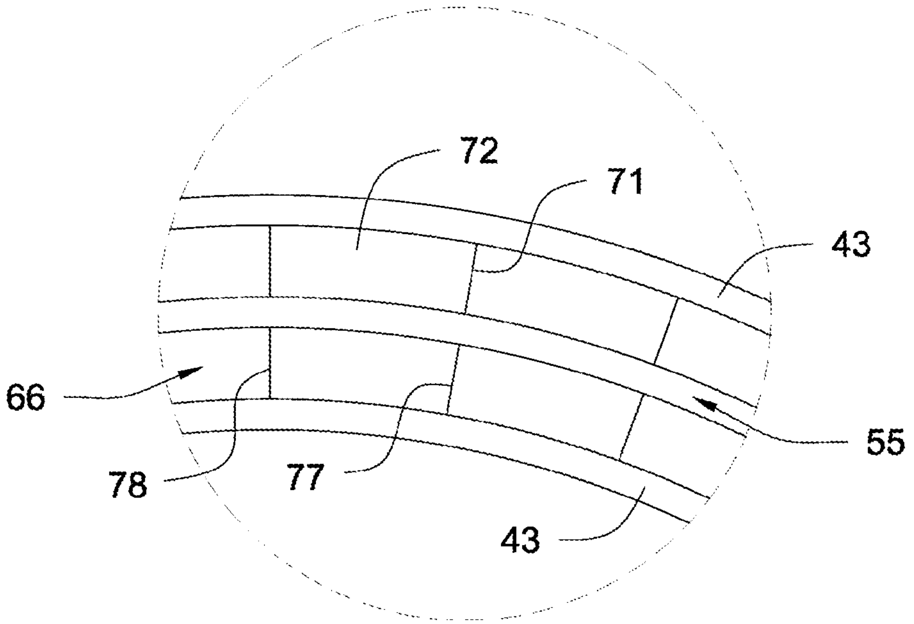
(Prior Art) FIG. 16

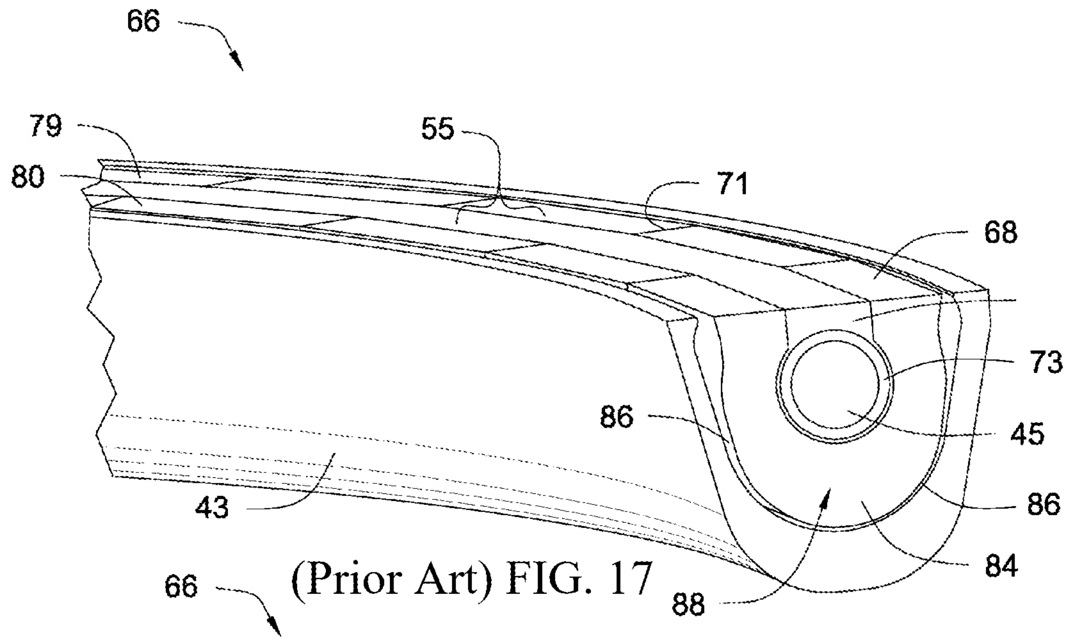
(Prior Art) FIG. 17
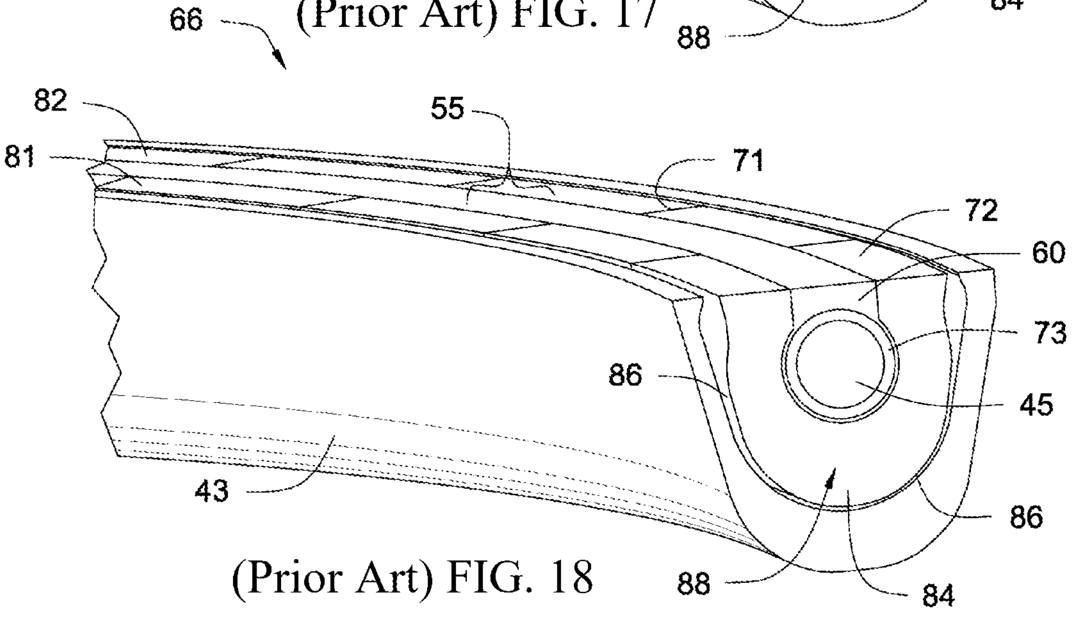
(Prior Art) FIG. 18

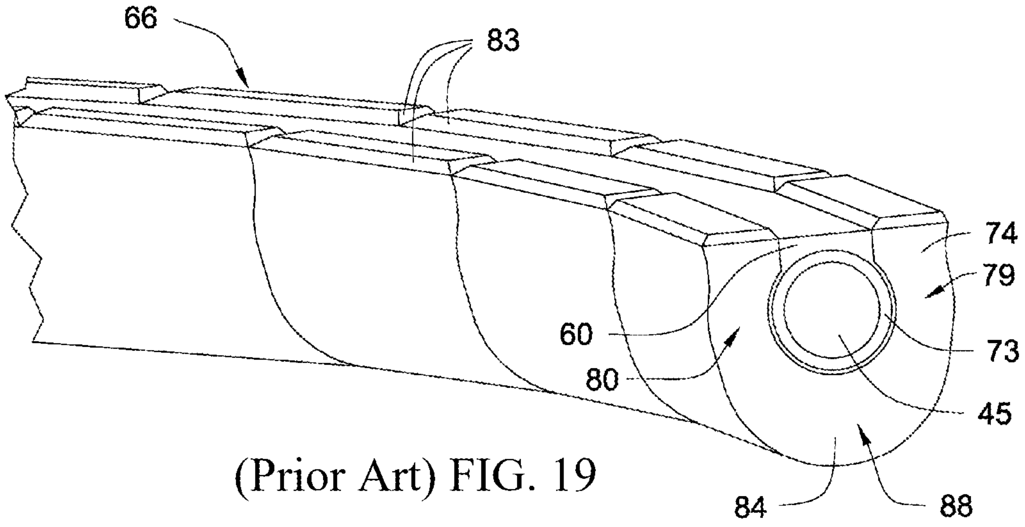
(Prior Art) FIG. 19

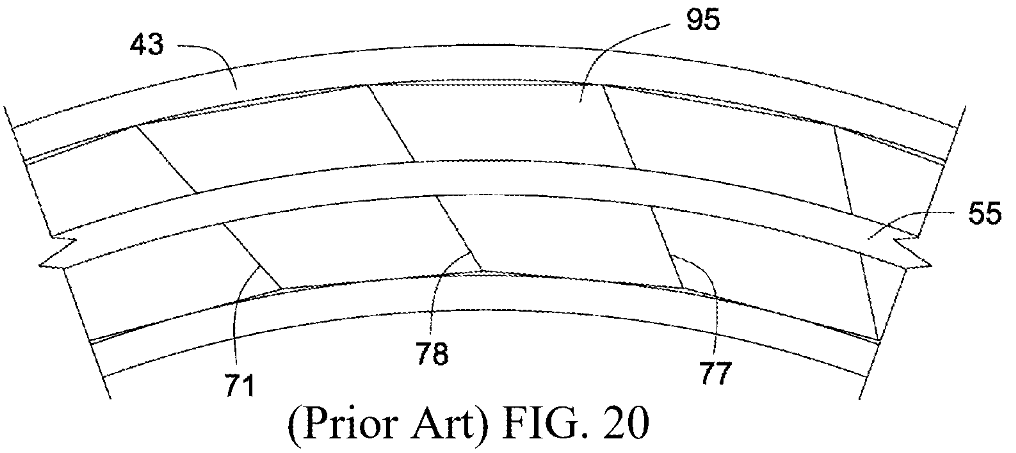
(Prior Art) FIG. 20
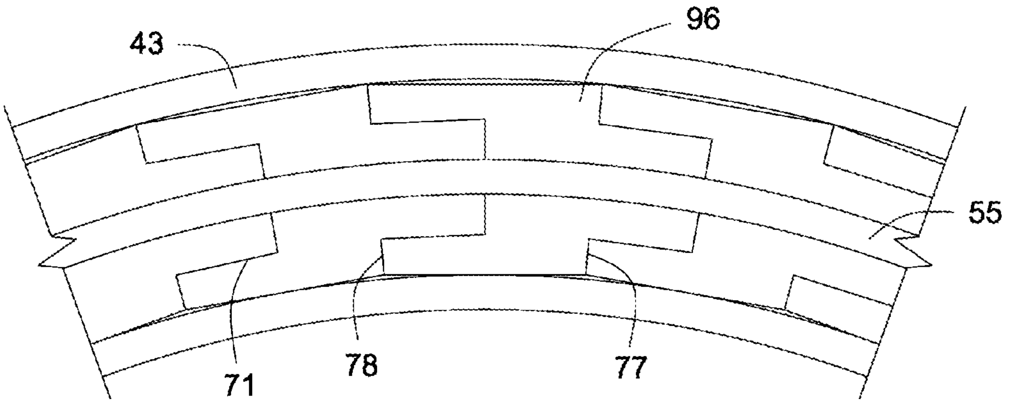
(Prior Art) FIG. 21
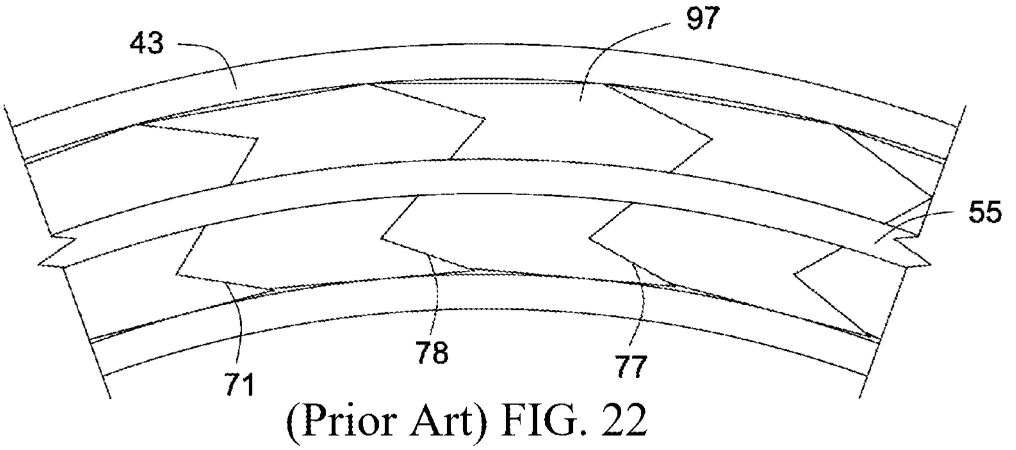
(Prior Art) FIG. 22

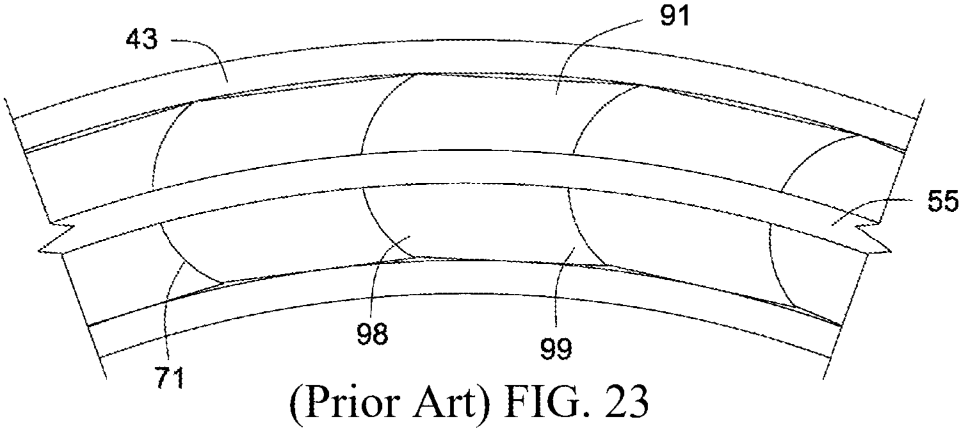
(Prior Art) FIG. 23
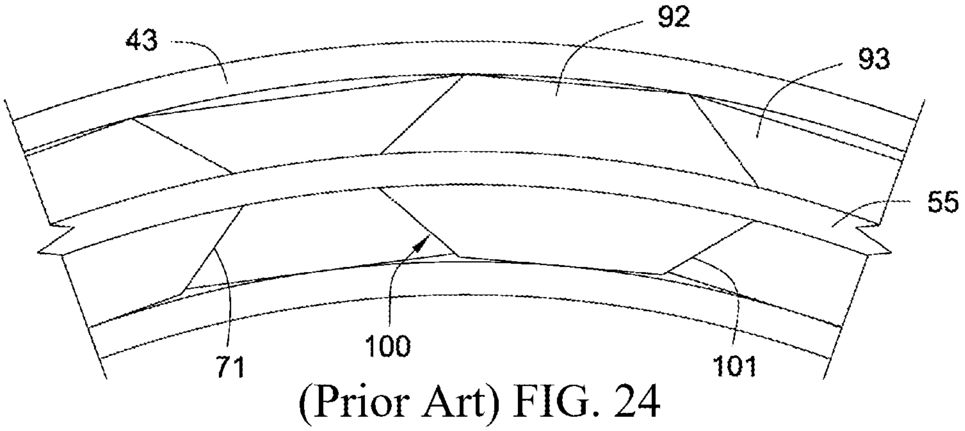
(Prior Art) FIG. 24
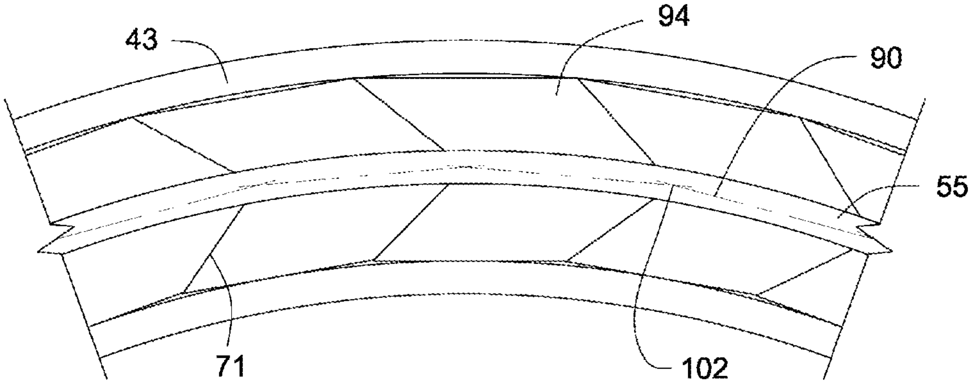
(Prior Art) FIG. 25

MCEI TROUGH FOR INDUCTIVE COUPLER

RELATED APPLICATIONS

This application presents a modification of U.S. Pat. No. 7,511,598, to Hall et al., entitled Elements For Use In An Inductive Coupler For Downhole Components, issued Mar. 31, 2009. Said Patent is incorporated herein by this reference.

U.S. patent application Ser. No. 17/543,655, to Fox, entitled Inductive Data Transmission System for Drill Pipe, filed Dec. 6, 2021, is incorporated herein by this reference.

U.S. patent application Ser. No. 17/559,619, to Fox, entitled Inductive Coupler For Downhole Transmission Line, filed Dec. 22, 2021, is incorporated herein by this reference.

BACKGROUND OF THE INVENTION

The following background is taken from the '598 reference and applies to this disclosure except when modified by this disclosure. This invention relates to elements for use in inductive couplers for down-hole components, more specifically this invention relates to elements comprising segments of magnetically conductive material.

U.S. Pat. No. 6,670,880, which is herein incorporated by reference, discloses a downhole transmission system through a string of downhole components. A first transmission element is located in one end of each downhole component, which element includes a first magnetically conducting, electrically-insulating trough, and a first electrically conductive coil lying there in. A second data transmission element is located in the other end, with a similar arrangement comprising a second magnetically conducting, electrically-insulating trough and a second electrically conductive coil. The transmission system further comprises an electrical conductor in electrical communication with and running between each first and second coil in the downhole component. The string of downhole components is cooperatively arranged such that the elements are in magnetic communication with each other to thereby transmit signals through induction.

U.S. Pat. No. 6,670,880 discloses that the magnetically conductive troughs are preferably easily magnetized and demagnetized. Examples of magnetically conductive materials were given including soft iron, ferrite, nickel iron alloys, silicon iron alloys, cobalt iron alloys and mu-metals. One example of a nickel/iron alloy has a trade name of Permalloy, which is a compound that comprises about 20% iron and 80% nickel. A preferred magnetically conductive material is ferrite.

Rectangular segments are used as a substitute for a solid ring in the '880 patent. Naturally, a circular trough comprising rectangular segments creates gaps between its segments. Rectangles by definition are not curved and do not conform to the curve created by the circumferences of the circular trough. Thus, interruptions including generally triangular or trapezoidal shaped gaps in the trough result from using the rectangular segments. Because the gaps in the magnetically conducting circular trough do not contribute to magnifying the magnetic field, it is now believed that these gaps may adversely affect the magnetic field generated by the magnetically conductive, electrically insulating trough.

SUMMARY OF THE INVENTION

In reference to FIGS. 1-5, this application presents an annular magnetically conductive electrically insulating (MCEI) trough or channel that may be used for data transmission in an inductive coupler system for drillstring tools, including in the drill pipe and the bottom hole assembly. The MCEI trough may comprise a ferrite material comprising oxygen, iron, and manganese elements in such quantities and sizes that may promote inductive coupling. The MCEI trough may comprise an axial interior channel comprising an axial opening intermediate its inner diameter and outer diameter top surfaces. The interior open channel may comprise an interior surface comprising an interior side wall joining an interior bottom wall. An exterior diameter side wall may be radially spaced apart from the interior diameter side wall. The respective spaced apart interior diameter side wall and exterior diameter side wall side walls may form the respective top surfaces. The top surfaces may be planar. The interior surface may comprise one or more interior axial flutes. The interior axial flutes may comprise axial flute ridges and interior flute furrows.

The exterior diameter side wall and the interior diameter side wall may also join an exterior bottom wall. The exterior diameter side wall surface may comprise one or more exterior axial flutes. The exterior axial flutes may comprise axial exterior flute ridges and exterior flute furrows. The respective interior and exterior flutes may promote stability of the MCEI trough when installed in a drill pipe or other downhole tool.

The annular MCEI trough may form a single piece ring, or the annular trough may comprise a plurality of MCEI annular trough segments arranged intimately in a ring. The trough segments may comprise axially spaced apart terminal surfaces intersecting the one or more axial flutes. The terminal surfaces may be nonparallel surfaces. The terminal surfaces may interlock with adjacent terminal surfaces in the ring configuration.

An electrically conductive wire coil may be disposed or laid within the open channel of the MCEI trough. The wire coil may comprise one or more exterior axial corrugations comprising corrugation grooves and corrugation crests. The ridges and furrows of the interior axial flutes may couple with the crests and grooves of the axial corrugations of the wire coil. The coupling of the wire coil with the interior axial flutes may aid in the positioning and retention of the wire coil in the channel of the MCEI trough.

The respective interior and exterior axial flute ridges may at least partially protrude from the MCEI trough wall surfaces. The ridges may protrude inward from the exterior wall surfaces and of the MCEI trough. The respective axial flute furrows and may at least partially extend inward from the respective wall surfaces. The coil wire may be captured within the channel by the one or more axial flutes protruding from the interior surface. The coil wire may comprise a single electrically conductive wire or a plurality of electrically wires. The coil wire may comprise a plurality of conductive wire strands. The fluted channel may aid in securing the wire strands 305 within the channel.

A polymeric filler material may encapsulate the wire coil within the fluted channel. The filler material may be non-electrically conducting.

The wire coil and coil strands may comprise a circular or noncircular cross section. The noncircular cross section may be for example an oval, a square, or a hexagon. The noncircular cross section of the wire coil and coil strands may promote packing within the channel and among the flutes. The conductive coil wire and strands may at least be partially captured within the channel by the axial flutes.

The annular MCEI trough and may be molded within an annular polymeric block. See the '619 reference. The annular polymeric block may comprise a substantial volume of ferrite particles and fibers. The annular trough may comprise perforations in the channel's bottom wall. See the '655 reference. The perforations may provide for a gapless MCEI circular trough, contrary to what is show in (Prior Art) FIG. 15, since the ends of the wire coil may pass though the perforations connecting the ends of the coil to ground and to a cable within the downhole tool.

The following portion of the summary is taken from the '598 reference. The following summary applies to this disclosure except when modified by this disclosure.

An element for use in an inductive coupler for downhole components comprises an annular housing having a generally circular recess. The element further comprises a plurality of generally linear, magnetically conductive segments. Each segment includes a bottom portion, an inner wall portion, and an outer wall portion. The portions together define a generally linear trough from a first end to a second end of each segment. The segments are arranged adjacent to each other within the housing recess so as to form a generally circular trough. The ends of the segments are shaped such that the first end of each segment is complementary to the second end of an adjacent segment.

The shaped ends are preferably selected from the group consisting of a concave shape, a convex shape, a V-shape, and a zigzagged shape.

In another aspect of the present invention, the first and second ends of the segments are generally planar and the first ends are angled to be parallel to the second end of the adjacent segment. In one embodiment, all of the ends are angled. Preferably, the first ends of the segments are angled with the same angle and the second ends of the segments are angled with the complementary angle.

In one aspect of the present invention, all of the ends are angled so that the included angle between the outer wall portion and each end in each segment is calculated as 90.degree.-180.degree./n, where n is the number of segments. In another aspect of the invention, every other segment arranged in the recess has two ends with an included angle between the outer wall portion and the two ends equal to 90.degree. The remaining segments have two ends with an included angle between the outer wall portion and the two ends calculated as 90.degree.-360.degree./n, where n is the total number of segments.

Preferably, the annular housing is a metal ring. More preferably, the annular housing is a steel ring. In other embodiments the annular housing is a stainless steel ring. Preferably, the annular housing is disposed in a groove formed in the end of a downhole component. In one aspect of the present invention, the element comprises an electrically insulating filler material. Preferably, the filler material is a polymer selected from a group consisting of epoxy, natural rubber, fiberglass, carbon fiber composite, polyurethane, silicon, a fluorinated polymer, grease, polytetrafluoroethylene and perfluoroalkoxy, or a combination thereof.

In the preferred embodiment the magnetically conductive segments comprise an easily magnetized and easily demagnetized material selected from the group consisting of soft iron, ferrite, a nickel iron alloy, a silicon iron alloy, a cobalt iron alloy, and a mumetal. Ferrite is the preferred material.

In another aspect of the present invention, the segments comprise a planar surface comprising both the inner wall portion and the outer wall portion which forms a chamfered edge with at least one of the ends.

The present invention provides the advantage that the parallel ends of the magnetically conductive segments may reduce gaps within the annular housing and thereby strengthen the magnetic field.

BRIEF DESCRIPTION OF THE DRAWINGS

(Prior Art) FIG. 6 is a cross sectional view of an embodiment of a downhole tool string.

(Prior Art) FIG. 7 is a perspective cross sectional view of an embodiment of the invention in downhole components.

(Prior Art) FIG. 8 is a perspective view of an embodiment of an inductive coupler.

(Prior Art) FIG. 9 is a cross-sectional view of an embodiment of a magnetic transmission circuit.

(Prior Art) FIG. 10 is an orthogonal view of an element (prior art).

(Prior Art) FIG. 11 is a detailed view of a section of FIG. 5 (prior art).

(Prior Art) FIG. 12 is an orthogonal view of an embodiment of an element.

(Prior Art) FIG. 13 is a detailed view of a section of FIG. 7.

(Prior Art) FIG. 14 is an orthogonal view of an embodiment of an element.

(Prior Art) FIG. 15 is an orthogonal view of an embodiment of an element.

(Prior Art) FIG. 16 is a detailed view of a section of FIG. 10.

(Prior Art) FIG. 17 is a partial perspective view of an embodiment of an element.

(Prior Art) FIG. 18 is a partial perspective view of an embodiment of an element.

(Prior Art) FIG. 19 is a partial perspective view of an embodiment of an element.

(Prior Art) FIG. 20 is a partial orthogonal view of an embodiment of an element.

(Prior Art) FIG. 21 is a partial orthogonal view of an embodiment of an element.

(Prior Art) FIG. 22 is a partial orthogonal view of an embodiment of an element.

(Prior Art) FIG. 23 is a partial orthogonal view of an embodiment of an element.

(Prior Art) FIG. 24 is a partial orthogonal view of an embodiment of an element.

(Prior Art) FIG. 24 is a partial orthogonal view of an embodiment of an element.

(Prior Art) FIG. 25 is a partial orthogonal view of an embodiment of an element.

DETAILED DESCRIPTION OF THE INVENTION

Figure 1:
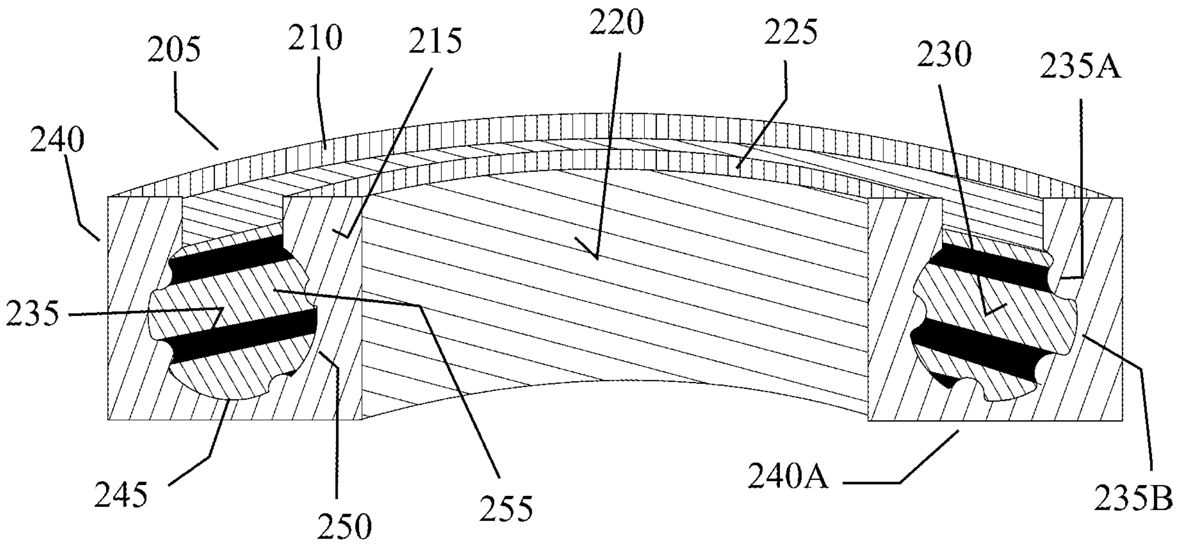
FIG. 1 is a sectioned diagram of the MCEI annular trough of the present invention.
Figure 2:
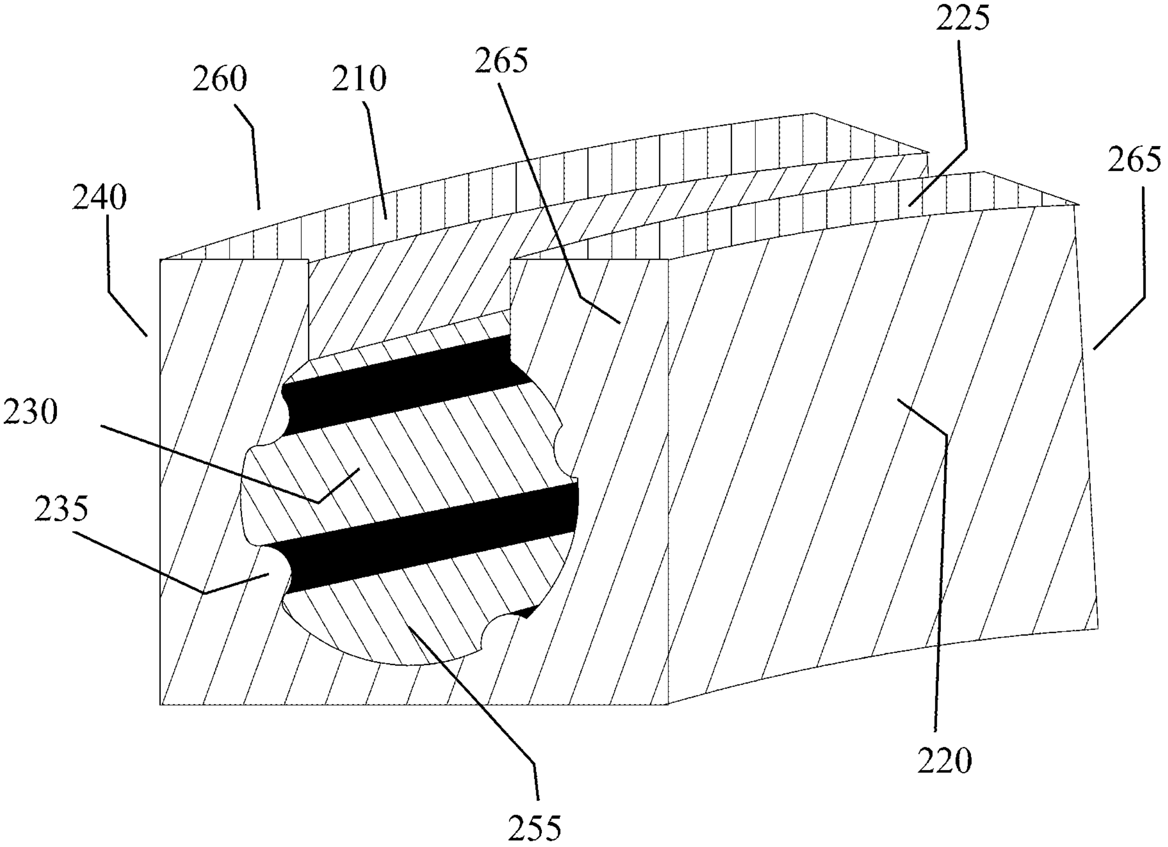
FIG. 2 is a diagram of the MCEI annular trough segment of the present invention.
Figure 3:
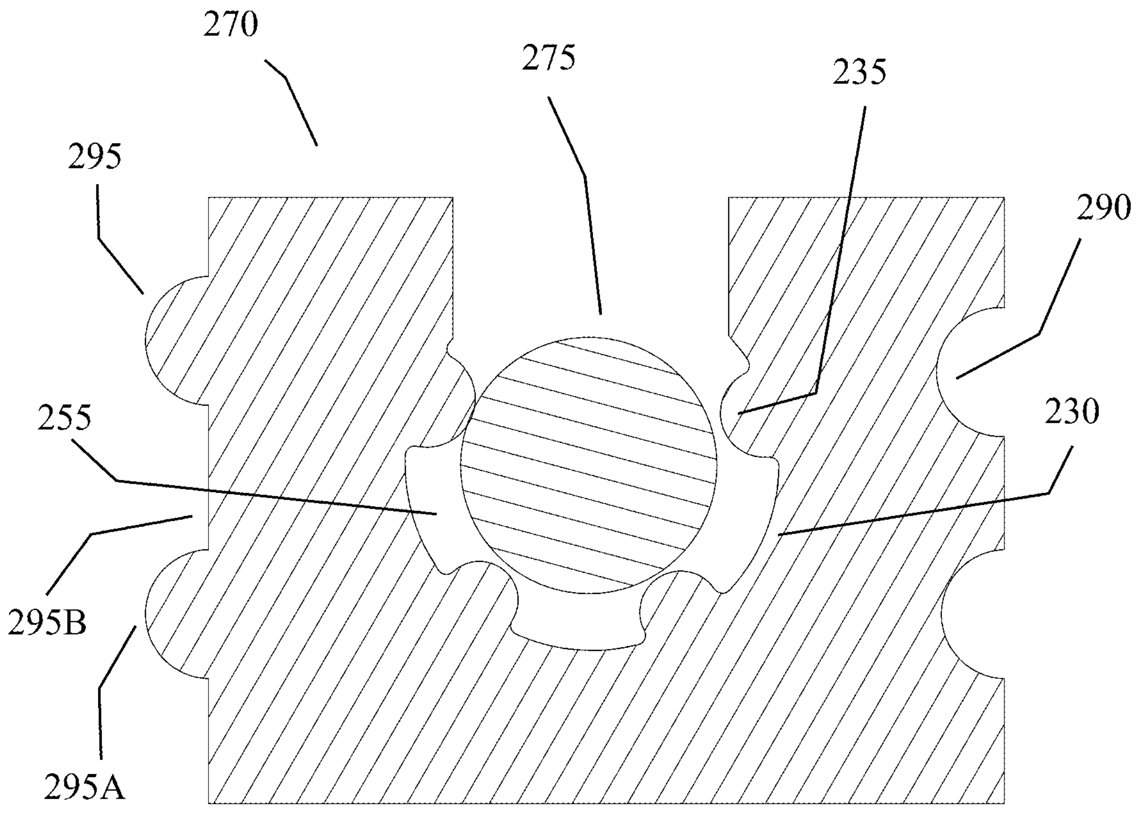
FIG. 3 is a sectioned diagram of a coil wire in the MCEI trough of the present invention.
Figure 4:
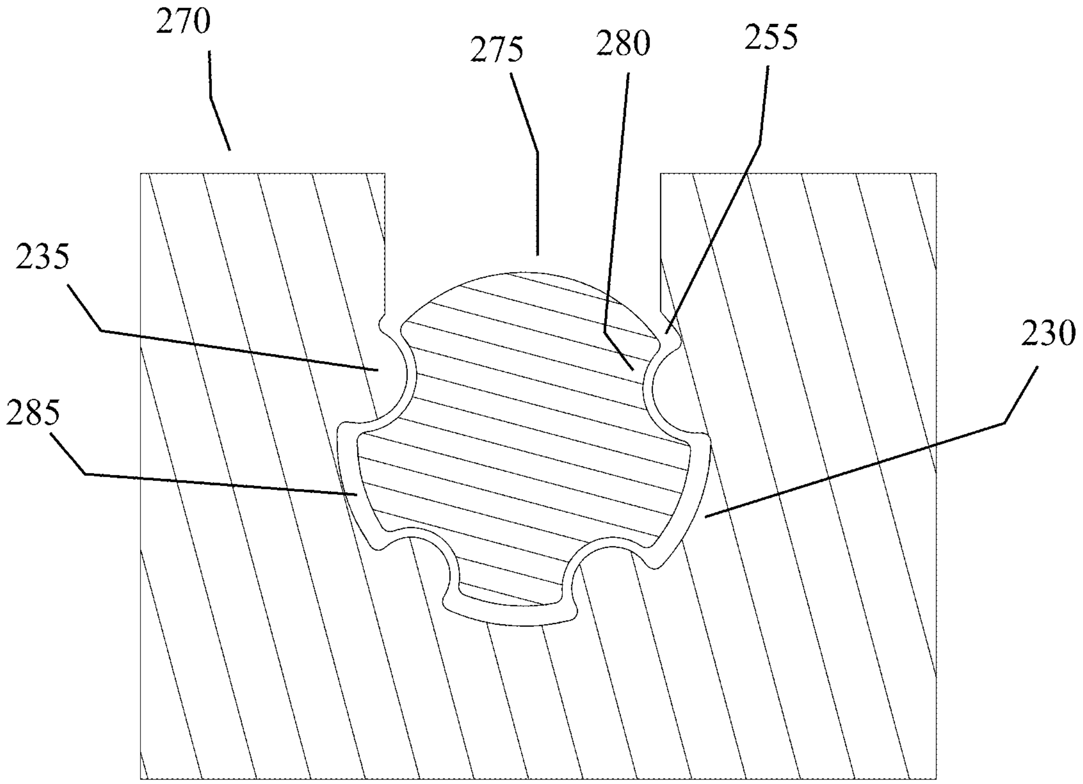
FIG. 4 is a sectioned diagram of a coil wire comprising corrugations of the present invention.
Figure 5:
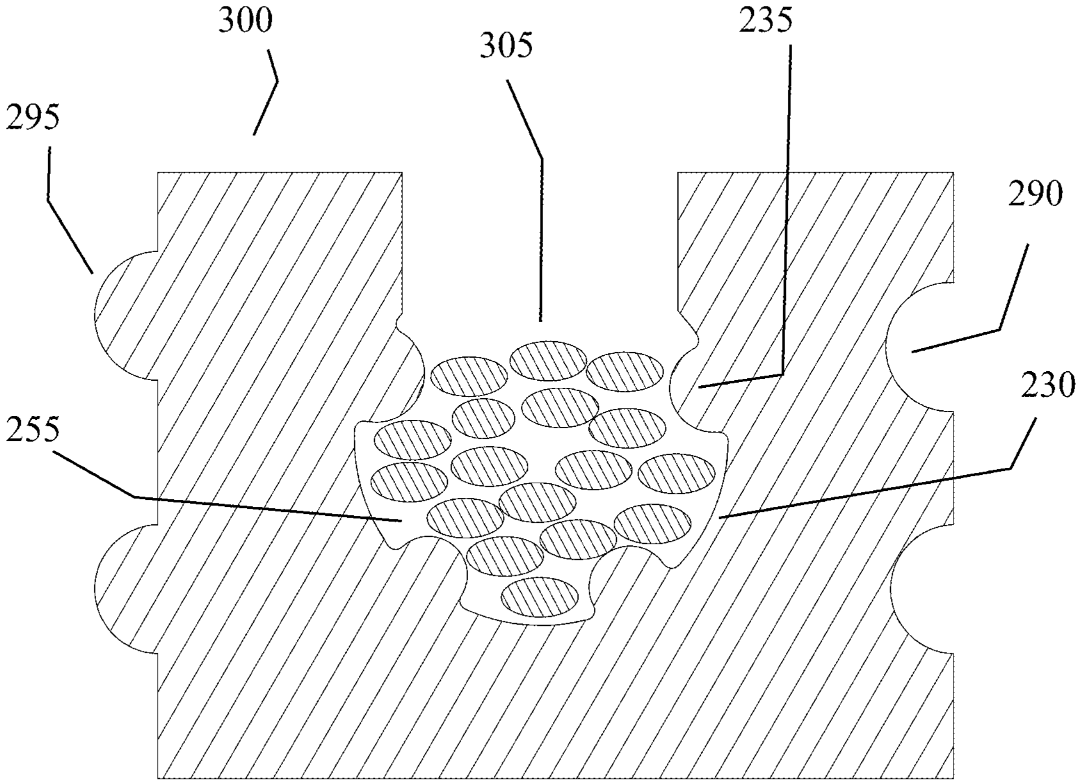
FIG. 5 is a sectioned diagram of a coil wire comprising wire strands of the present invention.

In Reference to FIGS. 1-5, this application presents an annular magnetically conductive electrically insulating (MCEI) trough or channel 205 that may be used for data transmission in an inductive coupler system for drillstring tools, including in the drill pipe and the bottom hole assembly. The MCEI trough 205 may comprise a ferrite material comprising oxygen, iron, and manganese elements in such quantities and sizes that may promote inductive coupling. The MCEI trough 205 may comprise an axial interior channel 255 comprising an axial opening intermediate its inner diameter 225 and outer diameter 210 top surfaces. The interior open channel 255 may comprise an interior surface 230 comprising an interior side wall 250 joining an interior bottom wall 245. An exterior diameter side wall 240 may be radially spaced apart from the interior diameter side wall 220. The respective spaced apart interior diameter side wall 220 and exterior diameter side wall 240 side walls may form the respective top surfaces 210, 225. The top surfaces 210, 225 may be planar. The interior surface 230 may comprise one or more interior axial flutes 235. The interior axial flutes 235 may comprise axial flute ridges 235A and interior flute furrows 235B.

The exterior diameter side wall 240 and the interior diameter side wall 220 may also join an exterior bottom wall 240A. The exterior diameter side wall surface 240 may comprise one or more exterior axial flutes 295. The exterior axial flutes 295 may comprise axial exterior flute ridges 285A and exterior flute furrows 295B. The respective interior and exterior flutes may promote stability of the MCEI trough when installed in a drill pipe or other downhole tool.

The annular MCEI trough may form a single piece ring, or the annular trough may comprise a plurality of MCEI annular trough segments 260 arranged intimately in a ring. The trough segments may comprise axially spaced apart terminal surfaces 265 intersecting the one or more axial flutes 235. The terminal surfaces 265 may be nonparallel surfaces. The terminal surfaces 265 may interlock with adjacent terminal surfaces 265 in the ring configuration.

An electrically conductive wire coil 275 may be disposed or laid within the open channel 255 of the MCEI trough 270. The wire coil 275 may comprise one or more exterior axial corrugations 280 comprising corrugation grooves 280 and corrugation crests 285. The ridges 235A and furrows 235B of the interior axial flutes 235 may couple with the crests 285 and grooves 280 of the axial corrugations 280 of the wire coil 275. The coupling of the wire coil 275 with the interior axial flutes 235 may aid in the positioning and retention of the wire coil 275 in the channel 255 of the MCEI trough 270.

The respective interior 235A and exterior 295A axial flute ridges may at least partially protrude from the MCEI trough 300 wall surfaces. The ridges 290 may protrude inward from the exterior wall surfaces 240 and 220 of the MCEI trough 300. The respective axial flute furrows 235B and 295B may at least partially extend inward from the respective wall surfaces. The coil wire 275 may be captured within the channel 255 by the one or more axial flutes 235 protruding from the interior surface 230. The coil wire 275 may comprise a single electrically conductive wire or a plurality of electrically wires. The coil wire 275 may comprise a plurality of conductive wire strands 305. The fluted channel may aid in securing the wire strands 305 within the channel 255.

A polymeric filler material may encapsulate the wire coil 275 within the fluted channel 255. The filler material may be nonelectrically conducting.

The wire coil 275 and coil strands 305 may comprise a circular or noncircular cross section. The noncircular cross section may be for example an oval, a square, or a hexagon. The noncircular cross section of the wire coil 275 and coil strands 305 may promote packing within the channel 255 and among the flutes 235. The conductive coil wire 275 and strands 305 may at least be partially captured within the channel 255 by the axial flutes 235.

The annular MCEI trough 205, 260, and 270 and may be molded within an annular polymeric block. See the ’619 reference. The annular polymeric block may comprise a substantial volume of ferrite particles and fibers. The annular trough may comprise perforations in the channel’s bottom wall 245. See the ’655 reference. The perforations may provide for a gapless MCEI circular trough since the ends of the wire coil may pass though the perforations connecting the ends of the coil to ground and to a cable within the downhole tool.

The following portion of the detailed description is taken from the ’598 reference and applies to this disclosure except when modified by this disclosure.

The disclosed description is meant to illustrate the present invention and not limit its scope. Other embodiments of the present invention are possible within the scope and spirit of the claims.

(Prior Art) FIG. 6 shows an embodiment of a downhole tool string 31 suspended in a well bore by a derrick 32. Surface equipment 33, such as a computer, connects to a data swivel 34. The data swivel 34 is adapted to transmit data to and from an integrated transmission network while the downhole tool string 31 is rotating. The integrated transmission network comprises the transmission systems of the individual components 35, 36, 57 of the downhole tool string 31. Preferably the downhole component is a tool 35.

Preferably the downhole component is a pipe 36, 57. Tools 35 may be located in the bottom hole assembly 37 or along the length of the downhole tool string 31. Examples of tools 35 on a bottom hole assembly 37 comprise sensors, drill bits, motors, hammers, and steering elements. Examples of tools 35 located along the downhole tool string 31 are links, jars, seismic sources, seismic receivers, sensors, and other tools that aid in the operations of the downhole tool string 31. Different sensors are useful downhole such as pressure sensors, temperature sensors, inclinometers, thermocouplers, accelerometers, and imaging devices. Preferably the downhole tool string 31 is a drill string. In other embodiments the downhole tool string 31 is part of a production well.

The downhole tool string 31 is made up of components, as shown in (Prior Art) FIG. 7. Preferably the components are pipes 36, 57 or some of the above mentioned tools 35. The components comprise inductive couplers 85 (shown in (Prior Art) FIG. 8) located in the secondary shoulder 39 of the pin end 40 and the secondary shoulder 41 of the box end 42 of the component 36, 57. Preferably, the inductive couplers 85 comprise an element 38, 47 comprising an annular housing 43 (shown in (Prior Art) FIG. 8) having a generally shaped recess 86 (shown in (Prior Art) FIG. 17). The element 38, 47 further comprises a plurality of generally linear, magnetically conductive segments 68, each of which segments 68 includes a bottom portion 88, an inner wall portion 80, and an outer wall portion 79 (shown in (Prior Art) FIG. 17). The portions 79, 80, 88 together define a generally linear trough 89 (shown in (Prior Art) FIG. 8) from one end to the other end of each segment. The segments 68 are arranged within the housing recess 86 so as to form a generally circular trough 55. At least half of the ends 77, 78 (shown in (Prior Art) FIG. 13) of the segments 68 are angled such that the ends 77, 78 of adjacent segments 68 are substantially parallel.

Preferably the element 38, 47 is disposed in an annular groove 62 (shown in (Prior Art) FIG. 9) formed in the secondary shoulders 39, 41. Preferably the annular housing 43 is a metal ring. More preferably, the annular housing 43 is a steel ring. The elements 38, 47, in a single downhole component, are connected by an electrical conductor 44. Preferably the electrical conductor 44 is a coaxial cable.

Preferably the circular trough 55 houses an electrically conductive coil 45 embedded in the magnetically conductive segments 68. Preferably, the magnetically conductive segments 68 comprise an easily magnetized and de-magnetized material selected from the group consisting of soft iron, ferrite, a nickel iron alloy, a silicon iron alloy, a cobalt iron alloy and a mu-metal. More preferably the magnetically conductive segments 68 are made of ferrite. Preferably the coil 45 comprises at least two loops of insulated wire. More preferably, the coil 45 comprises one loop of insulated wire. The coil 45 may comprise two or more loops of insulated wire. More preferably the coil 45 comprises one loop of insulated wire. Preferably, the wire is made of copper and is insulated with an insulating layer 73 (shown in (Prior Art) FIG. 17) of a varnish, enamel, or a polymer. When the components 36, 57 of the downhole tool string 31 up are made, the elements 38, 47 line up adjacent each other and allow data transmission between the components 36, 57. A threaded portion 48 located between the primary shoulder 49 and secondary shoulder 39 of the pin end 40 and a threaded portion 50 located between the primary shoulder 51 and secondary shoulder 41 of the box end 42 provide a means of attachment for the downhole components 36, 57.

(Prior Art) FIG. 8 shows an embodiment of a connection between the electrical conductor 44 and the electrical conducting coil 45. In the preferred embodiment, a signal travels along the electrical conductor 44 of a downhole component 36. The signal passes from the electrical conductor 44 to a lead wire 52 of the coil 45. The inductive coupler 85 comprises an anti-rotation device 53, which keeps the annular housing 43 from rotating about the axis of the lead wire 52. In the preferred embodiment the lead wire 52 may enter the annular housing 43 through a hole 75 (shown in (Prior Art) FIG. 10) in the annular housing 43, where there is a void 54 of magnetically conductive material. The coil 45 is housed within the circular trough 55 of magnetically conductive material and is grounded to the annular housing 43 in the void 54 of the magnetically conductive material.

Preferably, the grounded portion 56 of the coil 45 is brazed to the annular housing 43. In some embodiments of the present invention, the coil 45 and magnetically conductive segments 68 are disposed in a groove 62 formed in the secondary shoulders 39, 41 of both the pin end 40 and also in the box end 42 of the down-hole component 36. Preferably, the elements 38, 47 comprise an electrically insulating filler material 60 (shown in (Prior Art) FIG. 17) which holds the segmented circular trough 55 in place. Preferably the filler material 60 is a polymer selected from the group consisting of epoxy, natural rubber, fiberglass, carbon fiber composite, polyurethane, silicon, a fluorinated polymer, grease, polytetrafluoroethylene and perfluoroalkoxy, fluorinated ethylene propylene copolymer (FEP), or a combination thereof. Polytetrafluoroethylene and perfluoroalkoxy are the more preferred filler materials 60, with FEP grade 6100 the most preferred material.

It is important that the electrically-insulating filler material 60 withstand the elevated pressures and temperatures in downhole conditions. Consequently, it is preferred to treat the filler material 60 to make sure that it does not contain any air pockets. Preferably the filler material 60 is centrifuged to remove all bubbles that might be introduced during mixing. One such treatment method involves subjecting the filler material 60 in a centrifuge. A most preferred form of this method subjects the material 60 to a centrifuge at between 2500 to 5000 rpm for about 0.5 to 3 minutes.

(Prior Art) FIG. 9 shows an embodiment of the magnetic transmission circuit 61 formed by cooperating magnetic fields. As the signal travels along the coil 45, the magnetic field from the electrical current is concentrated by the magnetically conductive segments 68. The concentrated magnetic field influences the magnetically conductive segments 68 in the adjacent element 47 in the adjacent downhole component 57. The electrically conducting coils 45, 59 are arranged in a manner to allow the magnetic fields to generate a magnetic transmission circuit 61. A magnetic transmission circuit 61 may be allowed by disposing one coil 45 in a clockwise direction in the segmented circular trough 55 and disposing an adjacent coil 59 in a counterclockwise direction in an adjacent segmented circular trough 76. The coil 59 in the adjacent element 47 is influenced by the magnetic transmission circuit 61 to generate an electrical current and that signal is passed to the electrical conductor 58 in the adjacent downhole component 57.

(Prior Art) FIGS. 10 and 11 show the prior art using rectangular segments 67. Rectangular segments 67 of magnetically conductive material necessarily leave gaps 65 in the circular trough 55. It is believed that a MCEI trough formed with these gaps provide a magnetic field and allow transmission.

Angled ends 77, 78 (shown in (Prior Art) FIG. 13) of the magnetically conductive segments 68, may reduce the gaps 65 significantly as the ends are complementary. Elements 38, 47 with rectangular segments 67 lose a percentage of the signal strength passed between them. Repeaters, which are included throughout the downhole tool string 31, are used to strengthen the diminished signals. It is believed that by reducing the size of the gaps 65 in the annular housing 43, that a stronger magnetic field is generated, which results in passing a stronger signal between the elements 38, 47.

(Prior Art) FIG. 12 shows an embodiment of an element 38 wherein all of the ends 77, 78 are angled. (Prior Art) FIG. 13 is a detailed view of a portion of (Prior Art) FIG. 12. In the preferred embodiment of the present invention, all of the one ends 77 of the segments 68 are angled with the same angle and all of the other ends 78 of the segment 68 are angled with the complementary angle. The magnetic transmission circuit 61 is represented coming out of the page by 69 and represented going into the page by 70. Since the one end 77 in this embodiment is planar and generally parallel to the other end 78, the segments 68 may be arranged in the annular housing 43 such that minimal gaps 71 are formed. As used herein a minimal gap refers to a gap of between about 0.050 and 0.0001 inches. It is believed that the minimal gaps 71 have a negligible adverse affect on the magnetic transmission circuit 61.

In one aspect of the present invention, all of the ends 77, 78 are angled in a complementary fashion so that the included angle between the outer wall portion 79 and each end 77, 78 in each segment 68 is calculated as 90.degree.-180.degree./n, wherein n is the number of segments 68. For example if the annular housing 43 comprised forty segments 68, all with angled edges 77, 78 and are arranged to form minimal gaps 71 with no voids 54 in the annular housing 43, then the included angle between the outer wall portion 79 and each end 77, 78 would be 85.5.degree.

In another aspect of the present invention is shown in (Prior Art) FIG. 14, every other segment 67 arranged in the recess 86 has two ends 84, 85 with an included angle between the outer wall portion 79 and the two ends 84, 85 equal to 90.degree, and wherein the remaining segments 68 have two ends 77, 78 arranged in a complementary manner with an included angle between the outer wall portion 79 and the two ends 77, 78 calculated as 90.degree.-360.degree./n, where n is the total number of segments 67, 68. An embodiment is show in (Prior Art) FIG. 14. An example illustrates that if the annular housing 43 comprised forty segments 67, 68, half of which were rectangular segments 67, and all the segments 67, 68 are arranged such so as to form minimal gaps 71 and that there are no voids 54, then the angle included between the outer wall portion 79 and the angled ends 77, 78 would be 81. degree.

(Prior Art) FIG. 14 also illustrates a magnetic transmission circuit 61 running in an opposite direction as shown in (Prior Art) FIG. 12, due to the electrically conducting coil 45 running in a counterclockwise direction.

(Prior Art) FIG. 15 shows an embodiment of generally linear shaped segments 72 comprising curved inner wall portions 81 and curved outer wall portions 82. The first end 77 and the second ends 78 of the segments 72 are shaped such that the first end 77 of each segment 72 is complementary to the second end 78 of adjacent segments. Some small gaps may still be present between these annular housing 43 and the magnetically conductive segments 72; however, these gaps are believed to have less impact on the strength of the magnetic field, and are smaller than the gaps 65 created by the segments 68 with angled ends 77, 78 and the annular housing 43. In order for the current in the electrically conducting coil 45 to influence the magnetically conductive segments 67, 68, 72 to generate a magnetic field, the electrically conducting coil 45 needs to be at least partially encapsulated in the magnetically conductive material. Other factors such as the number of loops in the electrically conducting coil 45, the thickness of the electrically conducting coil 45, and the length of the cross section of magnetically conductive circular trough 55, all have positive direct relationships with the strength of the magnetic transmission circuit 61. The gaps 65 that are present between the annular housing 43 and the segments 68 affect the strength of the magnetic field by decreasing the thickness of the cross section of the circular trough 55, which is believed to be considerably less than the impact that the gaps 65 formed between the segments 68 and the annular housing 43 have on the magnetic field strength. (Prior Art) FIG. 16 shows a detailed view of the (Prior Art) FIG. 15. (Prior Art) FIG. 17 is a perspective view of an element. (Prior Art) FIG. 18 is a perspective view of (Prior Art) FIG. 15.

(Prior Art) FIG. 19 shows an embodiment of the present invention wherein the segments 74 comprise a planar surface 66 comprising both the inner wall portion 80 and the outer wall portion 79 which forms a chamfered edge 83 with at least one of the ends 77, 78. When attaching the downhole components 36, 57 in a down-hole tool string 31, the planar surfaces 66 slide together under some friction. Depending on the pitch and other factors dealing with the threaded portion 48 on the pipe, the planar surfaces 66 may slide against each other for 5 to 30 degrees. However, 5 to 10 degrees is more likely. The chamfered edge 83 prevents the ends 77, 78, 84, 85 of the segments 74 from catching while the planar surfaces 66 are sliding against each other. Ideally the surfaces 66 are coated with the filler material 60 and then grinded down to provide a smooth surface 66, but if a segment 67, 68, 72 is popped out of the recess 86 a little bit, the planar surfaces 66 of one of the elements 38, 47 may be damaged. Popped up segments 67, 68, 72 may be destroyed or create a gap, such as a groove, scratch, or crack in one of the planar surfaces 66 which may adversely affect the magnetic transmission circuit 61. When the planar surface 66 is being finished, it is important that the polishing procedures do not compromise the surface 66 in such a way as to interfere with the magnetic transmission circuit 61.

It is believed that the electrical signal passed between the elements 38, 47 is stronger when the planar surfaces 66 are in physical contact with each other. It is believed, that the physical contact between the planar surfaces 66 increases the cross section of the magnetically conductive material, and this increases the magnetic field. Sometimes rocks or dirt keep the planar surfaces 66 from touching each other. The signal may still pass between the elements 38, 47, even if the planar surfaces 66 aren't touching because the magnetic transmission circuit 61 may still be made, but the signal is weaker. It is believed that if a small space exists, then air's magnetic resistance adversely affects the magnetic fields. A rock or some other object may dislodge one or more of the segments 67, 68, 72, but it is believed that segments 74 with chamfered edges 83 may reduce the frequency that it happens.

A method of forming an element 38, 47 of magnetically conductive segments 67, 68, 72, 74 begins with providing a mold having a trough conforming to the final dimensions of the circular trough 55. A two-part, heat-curable epoxy formulation is mixed in a centrifuge cup, to which the individual magnetically conductive segments 67, 68, 72, 74 and a length of fiberglass rope are added. The parts are centrifuged for up to 30 minutes to cause all bubbles induced by mixing to rise out of the viscous liquid, and to cause the liquid to penetrate and seal any porosity in the magnetically conductive material. The fiberglass rope is then laid in the bottom of the mold, which is either made from a material, which does not bond to epoxy, such as polymerized tetrafluoroethane or which is coated with a mold release agent. The individual magnetically conductive segments 67, 68, 72, 74 are then placed on top of the fiberglass rope, to fill the circle. Any excess epoxy is wiped out of the groove. The planar surfaces 66 of the parts may be precisely aligned with each other by holding them in position with magnets placed around the circular trough in the mold. After the epoxy is cured, either at room temperature or in an oven, the circular tough 46 is removed from the mold. Other filler materials may be used in the place of epoxy such as the filler materials mentioned above.

(Prior Art) FIG. 20 shows an embodiment of an element comprising diamond shaped segments 95. Complementary ends 78 and 77 are arranged in the housing 43 to fit to form a minimal gap 71, which is believed to not adversely affect the magnetic transmission circuit. (Prior Art) FIG. 21 shows an embodiment comprising interlocking segments 96 having non-planar ends. Non-planar end 77 is inserted into complementary end 78 and is believed to produce a minimal gap 71 between the segments 96. Zigzagged shaped non-planar segments 97 are shown in (Prior Art) FIG. 22. (Prior Art) FIG. 23 shows an embodiment of a segment 91 with a concave shaped non-planar end 99 and a convex shaped non-planar end 98. The concave shaped end 99 may be rotated in the complementary convex end 98 so that gaps 65 between the segment 91 and the annular housing 43 may be minimized and the gap between segments 91 may be minimal gaps 71. (Prior Art) FIG. 24 shows segments 92, 93 comprising V-shaped ends 100, 101. Segment 92 comprising two out-ward V-shaped ends 100 and segment 93 comprising two complementary inward V-shaped ends 101. In (Prior Art) FIG. 25 an embodiment of a segment 94 comprising both an inward V-shaped end 101 and an outward V-shaped end 100 is shown. Also shown in (Prior Art) FIG. 25 is a longitudinal axis 90 of one of the segments 94. In some embodiments, the longitudinal axis 90 runs from one 77 end of the segment 94 to the other end 78. The segments 68 may be arranged such that their longitudinal axes 90 intercept at a point 102 which is intermediate the two segments 68.

Whereas the present invention has been described in particular relation to the drawings attached hereto, it should be understood that other and further modifications apart from those shown or suggested herein, may be made within the scope and spirit of the present invention.

The invention claimed is:

1. An annular magnetically conductive electrically insulating (MCEI) trough, comprising:

- a channel comprising an axial opening intermediate an interior diameter top surface and exterior diameter top surface;
- the axial opening of the channel comprising an interior surface comprising side walls joining a bottom wall of the channel;
- an exterior diameter side wall and an interior diameter side wall radially spaced apart from the side walls of the interior surface;
- the spaced apart interior diameter side wall and exterior diameter side wall forming the interior diameter top surface and exterior diameter top surface, wherein the interior diameter top surface comprises one or more axial flutes comprising ridges and furrows.

2. The annular MCEI trough of claim 1, wherein the exterior diameter and interior diameter top surfaces comprise the one or more axial flutes comprising the ridges and the furrows.

3. The annular MCEI trough of claim 1, wherein the annular MCEI trough comprises a plurality of MCEI annular trough segments comprising axially spaced apart terminal surfaces intersecting the one or more axial flutes.

4. The annular MCEI trough of claim 3, wherein the terminal surfaces interlock with adjacent terminal surfaces.

5. The annular MCEI trough of claim 1, wherein a coil wire is laid within the axial opening of the channel.

6. The annular MCEI trough of claim 1, wherein a coil wire laid within the axial opening of the channel comprises one or more exterior axial corrugations comprising corrugation grooves and corrugation crests.

7. The annular MCEI trough of claim 6, wherein the ridges and furrows of the one or more axial flutes of the interior surface couple with the corrugation crests and corrugation grooves of the one or more exterior axial corrugations of the coil wire.

8. The annular MCEI trough of claim 1, wherein the one or more axial flutes at least partially protrude outward from the interior diameter and exterior diameter top surfaces.

9. The annular MCEI trough of claim 1, wherein the one or more axial flutes at least partially protrude inward from the interior diameter and exterior diameter top surfaces.

10. The annular MCEI trough of claim 1, wherein a coil wire is captured within the channel by the one or more axial flutes protruding from the interior diameter top surface.

11. The annular MCEI trough of claim 1, wherein a filler material encapsulates a coil wire within an interior fluted channel of the channel.

12. The annular MCEI trough of claim 1, wherein a coil wire captured within the channel comprises a plurality of conductive metal strands.

13. The annular MCEI trough of claim 1, wherein a coil wire captured within the channel comprises a plurality of conductive noncircular metal strands.

14. The annular MCEI trough of claim 1, wherein a coil wire captured within the channel comprises a plurality of conductive hexagonal metal strands.

15. The annular MCEI trough of claim 1, wherein a coil wire comprises a plurality of conductive metal strands at least partially captured within the channel by the one or more axial flutes.

16. The annular MCEI trough of claim 1, wherein the annular MCEI trough comprises a ferrite material.

17. The annular MCEI trough of claim 1, wherein the annular MCEI trough comprises a ferrite material comprising micron and submicron sized elements of oxygen, iron, and manganese.

18. The annular MCEI trough of claim 1, wherein the annular MCEI trough is molded within an annular polymeric block.

19. The annular MCEI trough of claim 1, wherein the annular MCEI trough is molded within an annular polymeric block comprising a substantial volume of ferrite particles and fibers.

20. The annular MCEI trough of claim 1, wherein the annular MCEI trough comprises perforations in the bottom wall of the channel.

* * * * *